(12) United States Patent
Knott et al.

(10) Patent No.: US 8,324,325 B2
(45) Date of Patent: Dec. 4, 2012

(54) PROCESS FOR PREPARING POLYETHER ALCOHOLS WITH DMC CATALYSTS USING COMPOUNDS BEARING SIH GROUPS AS ADDITIVES

(75) Inventors: Wilfried Knott, Essen (DE); Frank Schubert, Neukirchen-Vluyn (DE)

(73) Assignee: Evonik Goldschmidt GmbH, Essen (DE)

( * ) Notice: Subject to any disclaimer, the term of this patent is extended or adjusted under 35 U.S.C. 154(b) by 854 days.

(21) Appl. No.: 12/277,871

(22) Filed: Nov. 25, 2008

(65) Prior Publication Data

US 2009/0137751 A1 May 28, 2009

(30) Foreign Application Priority Data

Nov. 28, 2007 (DE) ................ 10 2007 057 145

(51) Int. Cl.
*C08G 65/336* (2006.01)
*C08G 18/48* (2006.01)
*C08G 77/08* (2006.01)
*C08G 65/00* (2006.01)
*C08G 18/00* (2006.01)
*C08G 77/00* (2006.01)

(52) U.S. Cl. ........ 525/528; 525/523; 528/403; 528/425; 528/485

(58) Field of Classification Search .................. 528/403, 528/425, 485; 525/528, 523
See application file for complete search history.

(56) References Cited

FOREIGN PATENT DOCUMENTS

| EP | 0 485 637 A | 5/1992 |
| EP | 0 576 246 | 12/1993 |
| EP | 0 822 218 | 2/1998 |

*Primary Examiner* — Duc Truong
(74) *Attorney, Agent, or Firm* — Frommer Lawrence & Haug LLP

(57) ABSTRACT

Process for preparing polyether alcohols by polymerization by means of double metal cyanide catalysts (DMC catalysts), characterized in that, before or during the polymerization, one or more, optionally mixed additives consisting of compounds having one or more hydridic hydrogen atoms bonded to one silicon atom are added to the reaction mixture.

16 Claims, No Drawings

PROCESS FOR PREPARING POLYETHER ALCOHOLS WITH DMC CATALYSTS USING COMPOUNDS BEARING SIH GROUPS AS ADDITIVES

This application claims benefit under 35 U.S.C. 119(a) of German patent application DE 10 2007 057 145.5, filed on 28 Nov. 2007.

Any foregoing applications, including German patent application DE 10 2007 057 145.5, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to a process for controlling the molar mass distribution in the alkoxylation of hydroxyl compounds with epoxide monomers by means of double metal cyanide catalysts using specific hydrosiloxanes and silanes as additives which have at least one hydridic hydrogen atom bonded directly to the silicon atom.

Polyether alcohols, often also known simply and used synonymously as polyethers or polyetherols for short, have been known for some time and are prepared industrially in large amounts and serve, among other uses, through reaction with polyisocyanates, as starting compounds for preparing polyurethanes or else for the preparation of surfactants. Most processes for preparing alkoxylation products (polyethers) make use of basic catalysts, for example of the alkali metal hydroxides and of the alkali metal methoxides. Particularly widespread and known for many years is the use of KOH. Typically, a usually low molecular weight hydroxy-functional starter, such as butanol, allyl alcohol, propylene glycol or glycerol, is reacted in the presence of the alkaline catalyst with an alkylene oxide such as ethylene oxide, propylene oxide, butylene oxide or a mixture of different alkylene oxides to give a polyoxyalkylene polyether. The strongly alkaline reaction conditions in this so-called living polymerization promote various side reactions. Rearrangement of propylene oxide to allyl alcohol, which itself functions as a chain starter, and chain termination reactions, form polyethers with a relatively wide molar mass distribution and unsaturated by-products. Especially with allyl alcohol as the starter alcohol, the alkoxylation reaction performed under alkaline catalysis also affords propenyl polyethers. These propenyl polyethers are found to be unreactive by-products in the hydrosilylating further processing to give SiC-supported silicone polyether copolymers and are additionally—as a result of the hydrolytic liability of the vinyl ether bond present therein and release of propionaldehyde—the undesired source of olfactory product defects. This is described, for example, in EP-A-1431331 (U.S. 2004-132951).

One of the disadvantages of the base-catalyzed alkoxylation is without doubt the necessity of freeing the resulting reaction products from the active base with the aid of a neutralization step. In that case, it is absolutely necessary to distillatively remove the water formed in the neutralization and to remove the salt formed by filtration.

In addition to the base-catalyzed reaction, acid catalyzes are also known for alkoxylation. For instance, DE 10 2004 007561 (U.S. 2007-185353) describes the use of $HBF_4$ and of Lewis acids, for example $BF_3$, $AlCl_3$ and $SnCl_4$, in alkoxylation technology.

A disadvantage in the acid-catalyzed polyether synthesis is found to be the inadequate regioselectivity in the ring-opening of unsymmetrical oxiranes, for example propylene oxide, which leads to polyoxyalkylene chains with some secondary and primary OH termini being obtained in a manner without any obvious means of control. As in the case of the base-catalyzed alkoxylation reaction, a workup sequence of neutralization, distillation and filtration is indispensable here too. Where ethylene oxide is introduced as a monomer into the acid-catalyzed polyether synthesis, the formation of dioxane as an undesired by-product is to be expected.

The catalysts used to prepare polyether alcohols are, however, also frequently multimetal cyanide compounds or double metal cyanide catalysts, commonly also referred to as DMC catalysts. The use of DMC catalysts minimizes the content of unsaturated by-products, and the reaction also proceeds with a significantly higher space-time yield compared to the customary basic catalysts. The preparation and use of double metal cyanide complexes as alkoxylation catalysts has been known since the 1960s and is detailed, for example, in U.S. Pat. No. 3,427,256, U.S. Pat. No. 3,427,334, U.S. Pat. No. 3,427,335, U.S. Pat. No. 3,278,457, U.S. Pat. No. 3,278,458, U.S. Pat. No. 3,278,459. Among the ever more effective types of DMC catalysts which have been developed further in the subsequent years and are described, for example, in U.S. Pat. No. 5,470,813 and U.S. Pat. No. 5,482,908 are specifically zinc-cobalt hexacyano complexes. By virtue of their exceptionally high activity, only small catalyst concentrations are required to prepare polyetherols, such that it is possible to dispense with the workup stage needed for conventional alkaline catalysts—consisting of the neutralization, the precipitation and the filtering-off of the catalyst—at the end of the alkoxylation process. The alkoxylation products prepared with DMC catalysts are notable for a much narrower molar mass distribution compared to alkali-catalyzed products. The high selectivity of the DMC-catalyzed alkoxylation is responsible for the fact that, for example, propylene oxide-based polyethers contain only very small proportions of unsaturated by-products.

The alkoxylation reaction carried out over DMC catalysts in direct comparison with alkali and acid catalysis is so advantageous with the technical characteristics described that it has led to the development of continuous processes for preparing high-volume simple polyetherols usually consisting only of PO units. For instance, WO 98/03571 (U.S. Pat. No. 5,689,012) describes a process for continuously preparing polyether alcohols by means of DMC catalysts, in which a mixture of a starter and a DMC catalyst is initially charged in a continuous stirred tank, the catalyst is activated, and further starter, alkylene oxides and DMC catalysts are added continuously to this activated mixture, and, on attainment of the target fill level of the reactor, polyether alcohol is drawn off continuously.

JP 06-16806 refers to a process for continuously preparing polyether alcohols by means of DMC catalysts, likewise in a continuous stirred tank or in a tubular reactor, in which an activated starter substance mixture is initially charged at the inlet and alkylene oxide is metered in at various points in the tubular reactor.

DD 203 725 also refers to a process for continuously preparing polyether alcohols by means of DMC catalysts, in which an activated starter substance mixture is initially charged at the inlet in a tubular reactor and alkylene oxide is metered in at various points in the tubular reactor.

WO 01/62826 (U.S. Pat. No. 6,673,972), WO 01/62824 (U.S. Pat. No. 7,022,884) and WO 01/62825 (U.S. Pat. No. 6,664,428) refers to specific reactors for the continuous process for preparing polyether alcohols by means of DMC catalysts.

The patent literature for the industrial processes described here is geared especially to the monodispersity of the polyetherol obtained by DMC processes. For instance, narrow molar mass distributions are often desirable, as in the case of polyols utilized for PU foaming systems (DE 100 08630, U.S. Pat. No. 5,689,012).

However, a low molar mass distribution is not synonymous with high quality in all fields of use. In sensitive applications, too low a polydispersity may even be disadvantageous, which limits the usability of DMC-based polyethers/polyether alcohols. For instance, the document EP-A-1066334 (U.S. Pat. No. 6,066,683) points out in this connection that the polyether alcohols obtained by alkaline alkoxylation processes cannot be replaced in a simple manner with the polyetherols prepared by means of DMC catalysis. The utility of the polyetherols which have been obtained via DMC catalysis and have been characterized by their narrow molecular weight distribution is limited especially where the intention is to use them as copolymer components in silicone polyether copolymers which are involved in polyurethane foam systems, for example, as interface-active substances (PU foam stabilizers).

This industrially significant substance class is notable in that, even in a small dosage in the PU system to be foamed, it controls to a considerable degree the morphological characteristics thereof and hence the later use property of the foam parts obtained.

As detailed in U.S. Pat. No. 5,856,369 and U.S. Pat. No. 5,877,268, the high chemical purity and low polydispersity of the polyetherols prepared by means of DMC catalysts is desirable on the one hand, but, on the other hand, the DMC catalysis causes such a different kind of structure of the polyether chain compared to conventional, alkali-catalyzed polyethers that DMC-based polyetherols are suitable as precursors for interface-active polyether siloxanes only with high limitations. The usability of the usually allyl alcohol-started polyetherols described in the field of PU foam stabilizers is limited to a relatively small group of polyetherols which consist of ethylene oxide and propylene oxide monomer units in, in some cases, randomly mixed sequence and in which the ethylene oxide fraction must not be more than 60 mol %, in order to prevent the formation of polyethylene glycol blocks in the polymer chain. The fact that, furthermore, surfactant-active polyether siloxanes are prepared only by using blends of at least two DMC-based EO/PO polyetherols of different molar mass demonstrates that a very narrow molar mass distribution predetermined by the DMC technology according to the present prior art is in no way advantageous in the field of PU foam stabilizers.

The replacement of the polyetherols prepared by standard alkaline catalysis with those which are synthesized by DMC catalysis affords different kinds of alkoxylation products, which are usable only to a limited degree as copolymer components in established silicone polyether copolymers proven in PU.

The prior art makes reference to alkoxylation processes which make use of catalysis with double metal cyanide catalysts. Reference is made here by way of example to EP-A-1017738 (U.S. Pat. No. 6,077,978), U.S. Pat. No. 5,777,177, EP-A-0981407 (U.S. Pat. No. 5,844,070), WO 2006/002807 (U.S. 2007-225394) and EP-A-1474464 (U.S. 2005-159627).

In the patent literature, there is no lack of processes for influencing the mode of action of the DMC catalysts by interventions in the start phase of the alkoxylation process, which is a crucial phase for the later product composition, in such a way that the catalyst activity is enhanced and very high-purity products with minimum polydispersity are obtained, as have to date been unobtainable by conventional, usually alkaline catalysis processes. In EP-A-0222453 (U.S. Pat. No. 4,826,887), the addition of cocatalysts such as zinc sulphate serves to modify the DMC catalyst in such a way that it is optimally suitable in relation to the copolymerization of alkylene oxides with carbon dioxide. According to EP-A-0981407, it is possible by vacuum stripping of the starter/DMC catalyst mixture with inert gases to enhance the activity of the catalyst, to shorten the initialization phase before the alkylene oxide dosage and to prepare polyethers with particularly low polydispersity. U.S. Pat. No. 6,713,599 describes the addition of sterically hindered, protonating alcohols, phenols and carboxylic acids as an additive to the DMC catalyst in the start phase of the preparation process, with the aim of reducing the polydispersity of the products and of increasing the quality by obtaining particularly molecularly uniform polyethers.

As ZHANG et al. (AIChE Annual Meeting, Conference Proceedings Nov. 7-12, 2004, 353B) demonstrate convincingly, the kinetics of the alkoxylation over DMC catalysts is of such a unique nature that, even when backmixing reactors (loops, etc.) are used, the process which leads to a narrow molecular weight distribution cannot be steered in the direction of higher polydispersity.

The technical problem to be solved is thus defined as that of finding a process for DMC-catalyzed preparation of polyethers, which permits, by a chemical route, by intervention into the catalysis mechanism and irrespective of the reactor type (stirred reactor, loop reactor, ejector, tubular reactor or, for example, reactor battery) and process principle (batchwise mode or continuous process), molar mass distributions to be accessed in a controlled and reproducible manner according to the requirements of the desired field of use, and even polyethers to be prepared with a defined elevated polydispersity $M_w/M_n$ which is different if compared to polyethers produced by known processes. The process according to the invention preferably aims to prepare polyethers which are suitable directly themselves as interface-active compounds or else as precursors for preparing surfactants.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

It has been found that, surprisingly, the use of particular silicon compounds with one or more hydrogen atoms bonded directly to the silicon atom as an Si—H additive to the starter mixture composed of OH-functional starter and DMC catalyst will solve the problem.

Using the Si—H-additive results in a broadening of the polydispersity Mw/Mn of the produced polyether if compared to the polyether produced without using the Si—H-additive taking into account the same comparable reaction conditions.

Further subject of the invention is the use of special silicon compounds having one or more hydrogen atoms directly bounded to the silicon atom in a process of the DMC catalysis which results in a change in polydispersity at even low level concentration of the Si—H-additive. The Si—H-additive is used in a concentration level of 0.01 to 3 percent per weight, preferred 0.01 to 1 percent per weight, based in the total mass of the (produced) polyetheralcohols.

In the reaction mixture, the catalyst concentration is preferably >0 to 1.000 ppmw (ppm by mass), preferably >0 to 500 ppmw, more preferably 0.1 to 100 ppmw and most preferably 1 to 50 ppmw. This concentration is based on the total mass of the (produced) polyether polyols; the reaction temperature is 60 to 250° C., preferably of 90 to 160° C. and more preferably at a temperature of 100 to 130° C. The pressure at which the alkoxylation takes place is preferably 0.02 bar to 100 bar, preferably 0.05 to 20 bar absolute.

The addition of the Si—H-additive results in a significant broadening of the distribution in molar masses and a significant higher polydispersity of the resulting end products.

The significance of the broadening of the molar mass distribution or, in other words, of the increased polydispersity is evident immediately from the comparison of the experiments without the addition of the additive and hence of the unmodified DMC catalysis, which indicates a high level of reproducibility and molar mass uniformity.

The polydispersity of the produced polyetheralcohols using the inventive process is preferred at least 10 percent higher, more preferred at least 20 percent higher and most preferred at least 30 percent higher compared to an alkoxylation process performed without the Si—H-additive using the same reaction conditions. This result is nearly independent from the reaction conditions like for example the temperature, catalyst concentration of polymerization/alkylation time.

In absolute figures the polydispersity is preferred at least 0.1 higher, more preferred at least 0.2, and most preferred at least 0.4 higher using the Si—H-additive using the same reaction conditions. The absolute value of the change in polydispersity is e.g. as known to the artisan dependent from the concentration of the catalyst, the reaction time/duration, the concentration of the Si—H-additive, the starting alcohol and the resulting chain length of the polyetheralcohol produced.

Preferred are especially polyetherols using the inventive process which are based on the starting compounds like for example allylalcohol, hexenol, butanol, octanol, decanol, dodecanol, stearylalcohol, 2-ethyl hexanol, isononanol, ethylenglykole, propylene glycole, di-, tri- and polyethylene glycole, 1,2-propylenglycol, di- and polypropylene glycole, 1,4-butandiole, 1,6-hexandiole, trimethylol propane and glycerol having a polydispersity of higher or equal to 1.2 and a average molar mass below 8.000 g/mol. The polyether alcohols prepared using the same reaction conditions but without the Si—H-additive will show for comparison polydispersities of 1.05 to 1.15.

Further more also preferred are higher molecular polyether alcohols having an average molecular mass of higher than 8.000, prepared by using the inventive process and the starting compounds above having polydispersities of higher that or equal to 1.4. The polyetherols The polyether alcohols prepared using the same reaction conditions but without the Si—H-additive will show for comparison polydispersities of nearly 1.1 and in very special cases up to 1.3.

The values in percentage and absolute numbers above are based on typical GPC-measurements: column combination SDV 1000/10000 Å (length 65 cm), temperature 30° C., THF as mobile phase, flow rate 1 ml/min, sample concentration 10 g/l, RI-detector, analysis against polypropylene glycol standard.

A process is thus provided for preparing polyether alcohols with elevated polydispersity by polymerization by means of double metal cyanide catalysts (DMC catalysts), in which, before or during the polymerization, one or more, optionally mixed Si—H additives (in the following also referred to as additive only) consisting of compounds having one or more (hydridic) hydrogen atoms on one silicon atom, are added.

The covalent hydrogen-silicon bond exhibits a negative polarization of the hydrogen. This hydrogen is thus of hydridic nature and can react in an active manner, for example, with other H-acidic compounds (with release of hydrogen).

To what extent the hydridic character of the Si—H hydrogen has an effect in the process according to the invention is still unclarified.

Elevated polydispersity is understood to mean the difference in the $M_w/M_n$ value which arises from the comparison between the value in the case of (normal) standard DMC catalysis to that in the case of additional use of an inventive additive. According to the starter compound used, even a small increase in the value may be significant and positively influence the desired properties of the polymerization product.

Further embodiments of the inventive teaching are evident from the claims.

It is a further aim of the process according to the invention to preserve the advantages, known from the double metal cyanide systems, of a high reaction rate and of dispensing with the catalyst deactivation and removal. The broadening of the polydispersity depends on the concentration of the additive added, on its structure and, if appropriate, on the mixing ratio in the case of mixtures of additives; in each case, however, it is reproducible.

The silanes to be used with preference as additives in accordance with the invention are compounds of the general formula (I)

$$R'''_a H_b Si \qquad (I),$$

where

R''' is one or more identical or different radicals selected from linear or branched, saturated, mono- or polyunsaturated, alkyl, alkoxy, alkylsilyl, aryl, alkylaryl or arylalkyl radicals having 1 to 40 carbon atoms or haloalkyl groups having 1 to 20 carbon atoms, a is an integer of 1 to 3, b is an integer of 1 to 3, with the proviso that the sum of a and b is equal to 4 and at least one hydrogen atom bonded to a silicon atom is present in the molecule.

A nonexclusive list of such inventive silane additives of the formula (I), which can be used alone or in mixtures with one another or in combinations with hydrosiloxanes of the formula (II), comprises: monomethyl, dimethyl- and trimethylsilane, monoethyl-, diethyl-, triethylsilane, monopropyl-, dipropyl-, tripropylsilane, monophenyl-, diphenyl-, triphenyl-silane, phenylmethyl- and phenylethylsilane, phenyldimethyl- and phenyldiethylsilane, monomethoxy-, dimethoxy- and trimethoxysilane and monoethoxy-, diethoxy-, and triethoxysilane, dimethylmethoxysilane, methyldimethoxysilane and, for example, tris(trimethylsilyl) silane.

The hydrosiloxanes which are likewise used with preference as additives in accordance with the invention in addition to the silanes specified in formula (I) are polyorganosiloxanes of the general formula (II)

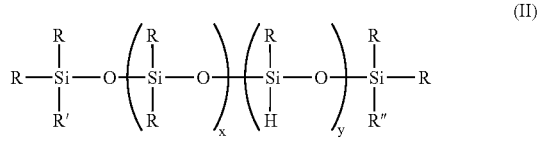

in which
R is one or more identical or different radicals selected from linear or branched, saturated, mono- or polyunsaturated alkyl, alkoxy, aryl, alkylaryl or arylalkyl radicals having 1 to 40 carbon atoms, in particular 1 to 20 carbon atoms, or haloalkyl groups having 1 to 20 carbon atoms, or siloxy groups and triorganosiloxy groups,
where
R' and R" are each independently H or R,
x is an integer in a range selected from the group consisting of 0 to 600 and 0 to 200,
y is an integer in a range selected from the group consisting of 0 to 100, 0 to 50, and <40,
with the proviso that at least one hydrogen atom bonded to a silicon atom is present in the molecule.

It is particularly unexpected that inventive additives with hydridic hydrogen are capable of influencing the mechanism of action of the double metal cyanide catalyst in a way that permits the kinetics of the chain growth to be modified and, according to the additive concentration and type, polydispersities of different magnitudes to be accessed. Entirely contrary to the remarks in U.S. Pat. No. 6,713,599 B1, where the addition of acidic OH-functional substances has the purpose of and achieves a reduction in the polydispersity of the polyethers, the use of specific hydrogen-substituted silicon compounds with hydridic hydrogen in the DMC-catalyzed alkoxylation brings about a significant increase in the polydispersity of the end products.

The particular additive is added to the reaction mixture in such a low concentration that it can remain in the finished polyether without any adverse effect on the product quality.

In contrast to the alkoxylation under base catalysis already described, allyl alcohol-based systems under DMC catalysis do not undergo any rearrangements to propenyl polyethers. Astonishingly and in no way foreseeably to the person skilled in the art, the catalyst system provided with an addition of hydrosiloxane or silane additives which has been claimed here in accordance with the invention also does not cause any undesired by-products having propenyl groups.

Thus, the process according to the invention still benefits from all advantages of DMC catalysis, with the additional benefit that the desired increase in the polydispersity can be established reproducibly.

The additive is added preferably in one portion at the beginning of the alkoxylation before the start of the metered addition of alkylene oxide, but can alternatively also be added continuously (for example dissolved/dispersed in the feed stream of the reactant(s)) and also in several portions during the continuous addition of alkylene oxide. The epoxide monomers usable in the context of the invention may, as well as ethylene oxide, propylene oxide, butylene oxide and styrene oxide, be all known further mono- and polyfunctional epoxide compounds, including the glycidyl ethers and esters, and individually or else as a mixture, and either randomly or in blockwise sequence.

It is possible to use one or more, optionally mixed additives of the structure specified.

To start the reaction, it may be advantageous when a reaction mixture which comprises the DMC catalyst, optionally slurried in a suspension medium, is initially charged in the reactor and at least one alkylene oxide is metered into this system. The molar ratio of alkylene oxide to reactive groups, especially OH groups, in the start mixture in this case is a range selected from the group consisting of 0.1 to 5:1 and 0.2 to 2:1. It may be advantageous when, before the addition of the alkylene oxide, any substances present which inhibit the reaction are removed from the reaction mixture, for example by distillation. The suspension media utilized may either be a polyether or inert solvents, or advantageously also the starter compound onto which the alkylene oxide is to be added, or a mixture of the two.

The start of the reaction can be detected, for example, by monitoring the pressure. A sudden drop in the pressure in the reactor indicates, in the case of gaseous alkylene oxides, that the alkylene oxide is being incorporated, the reaction has thus started and the end of the start phase has been attained.

After the start phase, i.e. after initialization of the reaction, according to the target molar mass, either starter compound and alkylene oxide at the same time or only alkylene oxide are metered in. Alternatively, it is also possible to add any desired mixture of different alkylene oxides. The reaction can be carried out in an inert solvent, for example for the purpose of lowering the viscosity. In one embodiment of the invention, the molar ratio of the alkylene oxides metered in, based on the starter compound used, especially based on the number of the OH groups in the starter compound used, is 1 to 106:1.

The alkylene oxides used may be compounds which have the general formula (IIIa)

where $R^2$ or $R^3$, and $R^5$ or $R^6$, are the same or else independently H or a saturated or optionally mono- or polyunsaturated, optionally mono- or polyvalent hydrocarbon radical which may also have further substitution, where the $R^5$ or $R^6$ radicals are each a monovalent hydrocarbon radical.

The hydrocarbon radical may be bridged cycloaliphatically via the fragment Y;
Y may be a methylene bridge having 0, 1 or 2 methylene units;
when Y is 0, $R^2$ or $R^3$ are independently a linear or branched radical having 1 to 20, preferably 1 to 10 carbon atoms, which includes but is not limited to a methyl, ethyl, propyl or butyl, vinyl, allyl radical or phenyl radical.

In one embodiment for Y, at least one of the two $R^2$ or $R^3$ radicals in formula (IIIa) is hydrogen. In another embodiment for Y, as the alkylene oxides, ethylene oxide, propylene oxide, 1,2- or 2,3-butylene oxide, isobutylene oxide, 1,2-dodecene oxide, styrene oxide, cyclohexene oxide (here, $R^2$-$R^3$ is a —$CH_2CH_2CH_2CH_2$— group, and Y is thus —$CH_2CH_2$—) or vinylcyclohexene oxide or mixtures thereof.

The hydrocarbon radicals $R^2$ and $R^3$ according to formula (IIIa) may themselves have further substitution and bear functional groups such as halogens, hydroxyl groups or glycidyloxypropyl groups. Such alkylene oxides include epichlorohydrin and 2,3-epoxy-1-propanol.

It is likewise possible to use glycidyl compounds such as glycidyl ethers and/or glycidyl esters of the general formula (IIIb)

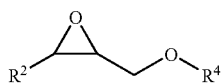
(IIIb)

in which at least one glycidyloxypropyl group is bonded via an ether or ester function $R^4$ to a linear or branched alkyl radical having 1 to 24 carbon atoms, an aromatic or cycloaliphatic radical. This class of compounds includes, for example, allyl glycidyl ether, butyl glycidyl ether, 2-ethylhexyl glycidyl ether, cyclohexyl glycidyl ether, benzyl glycidyl ether, C12/C14-fatty alcohol glycidyl ether, phenyl glycidyl ether, p-tert-butylphenyl glycidyl ether or o-cresyl glycidyl ether. Glycidyl esters used with preference are, for example, glycidyl methacrylate, glycidyl acrylate or glycidyl neodecanoate. It is likewise possible to use polyfunctional epoxide compounds, for example 1,2-ethyl diglycidyl ether, 1,4-butyl diglycidyl ether or 1,6-hexyl diglycidyl ether.

The starters used for the alkoxylation reaction may be all compounds $$R^1\text{—H} \qquad (IV)$$

(the H belongs to the OH group of the alcohol) which, according to formula (IV), have at least one reactive hydroxyl group.

In the context of the present invention, starter compounds are understood to mean substances which form the beginning (start) of the polyether molecule to be prepared, which is obtained by the addition of alkylene oxide. The starter compound used in the process according to the invention is preferably selected from the group of the alcohols, polyetherols or phenols or acids. The starter compound used is preferably a mono- or polyhydric polyether alcohol or alcohol $R^1$—H (the H belongs to the OH group of the alcohol).

The OH-functional starter compounds used are preferably compounds having molar masses of 18 to 2000 g/mol, especially 100 to 2000 g/mol, and 1 to 8, preferably 1 to 4, hydroxyl groups. Examples include but are not limited to allyl alcohol, butanol, octanol, dodecanol, stearyl alcohol, 2-ethylhexanol, cyclohexanol, benzyl alcohol, ethylene glycol, propylene glycol, di-, tri- and polyethylene glycol, 1,2-propylene glycol, di- and polypropylene glycol, 1,4-butanediol, 1,6-hexanediol, trimethylolpropane, glycerol, pentaerythritol, sorbitol, or compounds which bear hydroxyl groups and are based on natural substances.

Advantageously, low molecular weight polyetherols having 1-8 hydroxyl groups and molar masses of 100 to 2000 g/mol, which have themselves been prepared beforehand by DMC-catalyzed alkoxylation, are used as starter compounds.

In addition to compounds having aliphatic and cycloaliphatic OH groups, suitable compounds are any having 1-20 phenolic OH functions. These include, for example, phenol, alkyl- and arylphenols, bisphenol A and novolacs.

The process according to the invention can be used, according to the epoxide and the type of epoxide ring opening, to prepare polyether alcohols of the formula (Va) and (Vb) and mixtures thereof.

$$R^1\text{—}[(CR^6R^2\text{—}CR^5R^3\text{—}O)_n H]_m \qquad (Va)$$

$$\text{or } R^1\text{—}[(CR^5R^3\text{—}CR^6R^2\text{—}O)_n H]_m$$

$$R^1\text{—}[(CHR^2\text{—}CH(CH_2OR^4)\text{—}O)_n H]_m \qquad (Vb)$$

$$\text{or } R^1\text{—}[(CH(CH_2OR^4)\text{—}CHR^2\text{—}O)_n H]_m$$

where $R^1$ is either a hydroxyl radical or a radical of the organic starter compound and, in this case, is a radical having at least one carbon atom, m is a range selected from the group consisting of 1 to 8, 1 to 6, and 1 to 4, n is a range selected from the group consisting of 0 to 12 000, 1 to 800, 4 to 400 and 20 to 200, and the definitions of the $R^2$, $R^3$, $R^4$, $R^5$ and $R^6$ radicals correspond to those of the formula (IIIa) or (IIIb).

In particular, the process according to the invention can be used to synthesize polyethers of the formula (Va) or (Vb) which are notable in that they can be prepared in a controlled and reproducible manner with regard to structure and molar mass distribution. These polyethers are suitable as base materials for preparing, for example, polyurethanes, and are particularly suitable for preparing products with interface-active properties, including, for example, but not specified exclusively, organically modified siloxane compounds. These surfactants include—but without being limited thereto—silicone polyether copolymers as PU foam stabilizers, and equally emulsifiers, dispersants, defoamers, thickeners and, for example, release agents.

The process according to the invention, in which the alkoxylation of OH-functional compounds such as alcohols, polyols, phenols or else polyetherols is conducted by means of DMC catalysis in the presence of particular hydrogen-substituted silicon compounds of the formula (I) and (II), thus differs fundamentally in every aspect from the procedure described in U.S. Pat. No. 6,713,599 B1 and removes the hitherto unavoidable coupling of DMC catalysis and associated formation of polyethers of low polydispersity. An instrument is thus available which allows the advantages of DMC technology to be utilized further and in order to enhance the flexibility of the molar mass control, in order ultimately thus to widen the application spectrum of DMC-based products thus prepared to the sensitive sector of interface-active applications.

The type of alkylene oxides and glycidyl compounds used, the composition of mixtures of these epoxide compounds and the sequence of their addition during the DMC-catalyzed alkoxylation process depends on the desired end use of the polyether alcohols.

The reactors used for the reaction claimed in accordance with the invention may in principle be all suitable reactor types which allow the reaction and any exothermicity thereof present to be controlled.

The reaction can, in a manner known in process technology, be effected continuously, semicontinuously or else batchwise, and can be adjusted flexibly to the production technology equipment present.

In addition to conventional stirred tank reactors, it is also possible to use jet loop reactors with a gas phase and external heat exchangers, as described, for example, in EP-A-0 419 419, or internal heat exchanger tubes, as described in WO 01/62826. In addition, it is possible to use gas phase-free loop reactors.

In the metered addition of the reactants, a good distribution of the substances involved in the chemical reaction is needed, i.e. of the alkylene oxides and/or glycidyl compounds, starter, DMC catalyst and, if appropriate, suspension medium and of the inventive additive.

After the alkylene oxide addition and any continued reaction to complete the alkylene oxide conversion, the product can be worked up. The workup required here includes in principle only the removal of undepleted alkylene oxide and any further, volatile constituents, typically by vacuum distillation, steam or gas stripping or other methods of deodorization. Volatile secondary components can be removed either batchwise or continuously. In the process according to the invention based on DMC catalysis, in contrast to the conventional base-catalyzed alkoxylation, it is normally possible to dispense with a filtration.

It is possible if required to remove the DMC catalyst from the finished polyether alcohol. For most fields of use, it can, however, remain in the polyether alcohol. It is possible in principle, although not preferred, to remove the DMC catalyst and to reuse it, as described, for example, in WO 01/38421. However, this procedure is usually too complicated for the industrial scale preparation of polyether alcohols.

The alkylene oxide compounds or, stated in general terms, epoxide compounds are added at a temperature range selected from the group consisting of 60 to 250° C., 90 to 160° C. and 100 to 130° C. The pressure at which the alkoxylation takes place is selected from a range consisting of 0.02 bar to 100 bar and 0.05 to 20 bar absolute. By virtue of the performance of the alkoxylation under reduced pressure, the reaction can be performed very reliably. If appropriate, the alkoxylation can be carried out in the presence of an inert gas (e.g. nitrogen) and also at elevated pressure.

The process steps can be conducted at identical or different temperatures. The mixture of starter substance, DMC catalyst and optionally additive initially charged in the reactor at the start of the reaction can, before commencement of the metered addition of the alkylene oxides, be pretreated by stripping according to the teaching of WO 98/52689 (U.S. Pat. No. 5,844,070). In this case, an inert gas is added to the reaction mixture via the reactor feed, and relatively volatile components are removed from the reaction mixture by applying a reduced pressure with the aid of a vacuum system attached to the reactor system. In this simple manner, it is possible to remove substances which can inhibit the catalyst, for example lower alcohols or water, from the reaction mixture. The addition of inert gas and the simultaneous removal of the relatively volatile components may be advantageous especially at the startup, since the addition of the reactants or side reactions can also allow inhibiting compounds to get into the reaction mixture.

The DMC catalysts used may be all known DMC catalysts, preferably those which comprise zinc and cobalt, more preferably those which comprise zinc hexacyanocobaltate (III). Preference is given to using the DMC catalysts described in U.S. Pat. No. 5,158,922, US 20030119663, WO 01/80994 (U.S. Pat. No. 6,835,687) or in the abovementioned documents. The catalysts may be amorphous or crystalline.

In the reaction mixture, the catalyst concentration is selected from the ranges consisting of >0 to 1000 ppmw (ppm by mass), >0 to 500 ppmw, 0.1 to 100 ppmw and 1 to 50 ppmw. This concentration is based on the total mass of the polyether polyols.

Preference is given to metering the catalyst into the reactor only once. The amount of catalyst should be adjusted such that there is a sufficient catalytic activity for the process. The catalyst can be metered in as a solid or in the form of a catalyst suspension. Where a suspension is used, especially the starter polyether is suitable as the suspension medium. However, preference is given to dispensing with a suspension.

In one embodiment of the invention, the polydispersity $M_w/M_n$ is increased from about 10% to about 40% when a silicon compound with one or more hydrogen atoms bonded directly to the silicon atom is used as an additive to the starter mixture composed of OH-functional starter and DMC catalyst relative to a starter mixture without the additive. In another embodiment of the invention, the polydispersity $M_w/M_n$ is increased from about 20% to about 30% when a silicon compound with one or more hydrogen atoms bonded directly to the silicon atom is used as an additive to the starter mixture composed of OH-functional starter and DMC catalyst relative to a starter mixture without the additive. Depending on the reaction conditions and the additives used, even higher increases of polydispersity may be reached/expected, e.g. from about 40% to about 100%-200%.

The examples adduced serve only for illustration, but do not restrict the subject-matter of the invention in any way.

EXAMPLES

The values in percentage and absolute numbers of the GPC measurements are based on typical GPC-conditions: column combination SDV 1000/10000 Å (length 65 cm), temperature 30° C., THF as mobile phase, flow rate 1 ml/min, sample concentration 10 g/l, RI-detector, analysis against polypropylene glycol standard.

Preparation of Polypropylene Glycol by the Process According to the Invention with Addition of an Additive.

Example 1a

A 3 litre autoclave is initially charged with 215.7 g of polypropylene glycol (weight-average molar mass $M_w$=2000 g/mol), 0.03 g of zinc hexacyanocobaltate DMC catalyst and 5.9 g of heptamethylhydrotrisiloxane with an SiH content of 4.5 eq/kg (Rhodia), CAS [1873-88-7] under nitrogen and heated to 130° C. with stirring. The reactor is evacuated down to an internal pressure of 30 mbar in order to remove any volatile ingredients present by distillation. To activate the DMC catalyst, a portion of 40.0 g of propylene oxide is added. After the reaction has set in and the internal pressure has fallen, a further 944 g of propylene oxide are metered in continuously with cooling at 130° C. and internal reactor pressure max. 1.5 bar within 60 min. The 30 minutes of continued reaction at 130° C. are followed by the degassing stage. This removes volatile constituents such as residual propylene oxide by distillation at 130° C. under reduced pressure. The finished polyether is cooled to below 80° C. and discharged from the reactor.

The resulting long-chain polypropylene glycol has an OH number of 10.2 mg KOH/g, a viscosity (25° C.) of 10 400 mPas and, according to GPC (gel permeation chromatography), a polydispersity $M_w/M_n$ of 1.8 (against polypropylene glycol standard).

Comparative Experiment to 1A) without Addition of an Additive (Noninventive)

Example 1b

In a further reference experiment carried out analogously to Example 1a, in accordance with the prior art to date, no additive is added to the polypropylene glycol/DMC catalyst mixture at the start of the alkoxylation.

The resulting long-chain, low-viscosity polypropylene glycol has an OH number of 9.8 mg KOH/g, a viscosity (25° C.) of 7100 mPas and, according to GPC, a polydispersity $M_w/M_n$ of 1.4 (against polypropylene glycol standard).

Experiment Overview 1:

Influence of the additive addition on the polydispersity using the example of a long-chain polypropylene glycol
Starter polyether: polypropylene glycol ($M_w$=2000 g/mol), catalyst: zinc hexacyanocobaltate
GPC analyses against polypropylene glycol standard

| Experiment No. | Starter PO DMC cat. | Additive | Amount of additive | Reaction temp. | OH number [mg KOH/g] | GPC Mw/Mn |
|---|---|---|---|---|---|---|
| 1a | 215.7 g 984 g 0.03 g | Heptamethyl-hydrotrisiloxane CAS 1873-88-7 | 5.90 g | 130° C. | 10.1 | 1.8 |
| 1b* | 215.7 984 g 0.03 g | No additive | — | 130° C. | 9.8 | 1.4 |

*= reference experiment, noninventive

The polydispersity using the additive in the process is compared to the reference experiment higher by 0.4, which is corresponding to 28.6 percent.

Preparation of Mixed Ethylene Oxide/Propylene Oxide-Based Polyethers by the Process According to the Invention with Addition of an Additive Example 2a A 3 litre autoclave is initially charged with 180.0 g of polypropylene glycol monoallyl ether (weight-average molar mass $M_w$=400 g/mol), 0.08 g of zinc hexacyanocobaltate DMC catalyst and 5.25 g of heptamethylhydrotrisiloxane, CAS [1873-88-7], under nitrogen, and heated to 130° C. with stirring. The reactor is evacuated down to an internal pressure of 30 mbar, in order to remove any volatile ingredients present by distillation. To activate the DMC catalyst, a portion of 36.0 g of propylene oxide is added. After the reaction has set in and the internal pressure has fallen, 396 g of ethylene oxide and 1269 g of propylene oxide are metered in as a mixture continuously with cooling at 130° C. and internal reactor pressure max. 1.5 bar within 90 min. The 30 minutes of continued reaction at 130° C. are followed by the degassing stage. This removes volatile fractions such as residual propylene oxide by distillation under reduced pressure at 130° C. The finished polyether is cooled to below 60° C. and discharged from the reactor.

The resulting allyl polyether has an OH number of 13.5 mg KOH/g and, according to GPC, a polydispersity $M_w/M_n$ of 1.5 (against polypropylene glycol standard).

Example 2b

In an experiment carried out analogously to Example 2a, 4.10 g of the additive heptamethylhydrotrisiloxane (Rhodia) with an SiH content of 4.5 eq/kg, CAS [1873-88-7], are added to the polypropylene glycol monoallyl ether/DMC catalyst mixture at the start of the alkoxylation.

The resulting allyl polyether has an OH number of 13.4 mg KOH/g and, according to GPC, a polydispersity $M_w/M_n$ of 1.3 (against polypropylene glycol standard).

Example 2c

In an experiment carried out analogously to Example 2a, 5.0 g of the additive α,ω-di-hydropolydimethylsiloxane with an SiH content of 2.75 eq/kg, are added to the polypropylene glycol monoallyl ether/DMC catalyst mixture at the start of the alkoxylation.

The resulting allyl polyether has an OH number of 13.5 mg KOH/g and, according to GPC, a polydispersity $M_w/M_n$ of 1.5 (against polypropylene glycol standard).

Example 2d

In an experiment carried out analogously to Example 2a, 6.2 g of poly(methylhydro)poly(dimethylsiloxane) copolymer with an SiH content of 2.5 eq/kg are added as an additive to the polypropylene glycol monoallyl ether/DMC catalyst mixture at the start of the alkoxylation.

The resulting allyl polyether has an OH number of 13.4 mg KOH/g and, according to GPC, a polydispersity $M_w/M_n$ of 1.5 (against polypropylene glycol standard).

Comparative Experiment to 2a-d) Without Addition of an Additive (Noninventive)

Example 2e

In a further reference experiment carried out analogously to Example 2a, in accordance with the prior art to date, no additive is added to the polypropylene glycol monoallyl ether/DMC catalyst mixture at the start of the alkoxylation.

The resulting allyl polyether has an OH number of 13.4 mg KOH/g and, according to GPC, a low polydispersity $M_w/M_n$ of 1.05 (against polypropylene glycol standard).

The experimental overview 2 shows that the polydispersity by using the additive in experiments 2a), 2c) and 2d) is higher by 0.45 points or 42.8 percent if compared to the reference experiment 2e). In experiment 2b) the polydisperity is higher by 0.25 points or 23.8 percent if compared to the reference experiment 2e).

Experiment Overview 2:

Influence of the additive addition on the polydispersity using the example of an allyl polyether based on ethylene oxide and propylene oxide.

Starter polyether: polypropylene glycol monoallyl ether ($M_w$=400 g/mol)
Catalyst: zinc hexacyanocobaltate
GPC analyses against polypropylene glycol standard

| Experiment No. | Starter EO PO | DMC cat. | Additive | Amount of additive | Reaction temp. | OH number [mg KOH/g] | GPC Mw/Mn |
|---|---|---|---|---|---|---|---|
| 2a | 180 g 396 g 1305 g | 0.08 g | Heptamethyl-hydrotrisiloxane, CAS 1873-88-7 | 5.25 g | 130° C. | 13.5 | 1.5 |
| 2b | 180 g 396 g 1305 g | 0.08 g | Heptamethyl-hydrotrisiloxane, CAS 1873-88-7 | 4.1 g | 130° C. | 13.4 | 1.3 |
| 2c | 180 g 396 g 1305 g | 0.08 g | α,ω-dihydropoly-dimethylsiloxane | 5.0 g | 130° C. | 13.5 | 1.5 |
| 2d | 180 g 396 g 1305 g | 0.08 g | Poly(methylhydro)poly(dimethyl-siloxane) copolymer | 6.2 g | 130° C. | 13.4 | 1.5 |
| 2e* | 180 g 396 g 1305 g | 0.08 g | — | no additive | 130° C. | 13.4 | 1.05 |

*reference experiment, noninventive

Having thus described in detail various embodiments of the present invention, it is to be understood that many apparent variations thereof are possible without departing from the spirit or scope of the present invention.

The invention claimed is:

1. Process for preparing polyether alcohols with elevated polydispersity by polymerization by means of double metal cyanide catalysts (DMC catalysts), characterized in that, before or during the polymerization, one or more additives, optionally mixed, consisting of compounds having one or more hydrogen atoms bonded to one silicon atom as Si—H additive are added to the starting reaction mixture comprising the OH-functional starting compound and the DMC catalyst.

2. Process according to claim 1, characterized in that, the polydispersity Mw/Mn of the produced polyetherols is higher compared to a polyether produced without the Si—H-additive under otherwise same reaction conditions.

3. Process according to claim 1, characterized in that, the polydispersity of the produced polyetherols is at least 10 percent higher if compared to a process which is performed without the Si—H-additives.

4. Process according to claim 1, characterized in that, the absolute value of the polydispersity Mw/Mn is at least 0.1 higher if compared to a process which is performed without the Si—H-additives.

5. Process for preparing polyether alcohols according to claim 1, characterized in that the Si—H additive has the formula (I)

$$R'''_a H_b Si \quad (I),$$

where

R''' is one or more identical or different radicals selected from linear or branched, saturated, mono- or polyunsaturated, alkyl, alkoxy, alkylsilyl, aryl, alkylaryl or arylalkyl radicals having 1 to 40 carbon atoms or haloalkyl groups having 1 to 20 carbon atoms, a is an integer of 1 to 3, b is an integer of 1 to 3, with the proviso that the sum of a and b is equal to 4 and at least one hydrogen atom bonded to a silicon atom is present in the molecule.

6. Process for preparing polyether alcohols according to claim 2, characterized in that the silicon-hydrogen compounds of the formula (I) used are monomethyl, dimethyl- and trimethylsilane, monoethyl-, diethyl-, triethylsilane, monopropyl-, dipropyl-, tripropylsilane, monophenyl-, diphenyl-, triphenylsilane, phenylmethyl- and phenylethylsilane, phenyldimethyl- and phenyldiethylsilane, monoethoxy-, dimethoxy- and trimethoxysilane and monoethoxy-, diethoxy-, and triethoxysilane, dimethylmethoxysilane, methyldimethoxysilane or tris(trimethylsilyl)silane.

7. Process for preparing polyether alcohols according to claim 1, characterized in that the additives used are hydrosiloxanes or polyorganosiloxanes of the general formula (II)

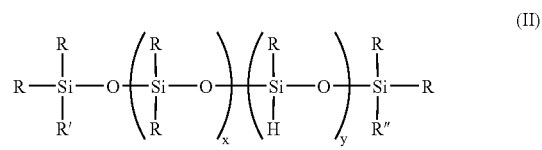

in which

R is one or more identical or different radicals selected from linear or branched, saturated, mono- or polyunsaturated alkyl, alkoxy, aryl, alkylaryl or arylalkyl radicals having 1 to 40 carbon atoms, or haloalkyl groups having 1 to 20 carbon atoms, or siloxy groups and triorganosiloxy groups, where R' and R" are each independently H or R, x is an integer of 0 to 600, y is an integer of 0 to 100, with the proviso that at least one hydrogen atom bonded to a silicon atom is present in the molecule.

8. Process for preparing polyether alcohols according to claim 1, characterized in that polyether alcohols of the formulae (Va) or (Vb)

$$R^1—[(CR^6R^2—CR^5R^3—O)_n H] \quad (Va)$$

$$\text{or } R^1—[(CR^5R^3—CR^6R^2—O)_n H]_m$$

$$R^1—[(CHR^2—CH(CH_2OR^4)—O)_n H]_m \quad (Vb)$$

$$\text{or } R^1—[(CH(CH_2OR^4)—CHR^2—O)_n H]_m$$

where $R^1$ is either a hydroxyl radical or a radical having at least one carbon atom, m is 1 to 8 and n is 1 to 12 000, and $R^2$ or $R^3$, and $R^5$ or $R^6$, are identically or else independently H or a saturated or optionally mono- or polyunsaturated, optionally mono- or polyvalent hydrocarbon radical which may also have further substitution; where the $R^5$ and $R^6$ radicals are each a monovalent hydrocarbon radical, are prepared.

9. Process according to claim 1 for preparing polyether alcohols of the formulae (Va) or (Vb)

$$R^1—[(CR^6R^2—CR^5R^3—O)_nH]_m \quad (Va)$$

$$\text{or } R^1—[(CR^5R^3—CR^6R^2—O)_nH]_m$$

$$R^1—[(CHR^2—CH(CH_2OR^4)—O)_nH]_m \quad (Vb)$$

$$\text{or } R^1—[(CH(CH_2OR^4)—CHR^2—O)_nH]_m$$

and mixtures thereof, where $R^1$ is either a hydroxyl radical or a radical having at least one carbon atom, m is 1 to 8 and n is 1 to 12 000, by polymerizing alkylene oxides of the formula (IIIa) or (IIIb)

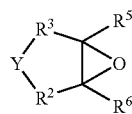
(IIIa)

where $R^2$ or $R^3$, and $R^5$ or $R^6$ are the same or are independently H or a saturated or optionally mono- or polyunsaturated, optionally mono- or polyvalent hydrocarbon radical which may also have further substitution, where the $R^5$ and $R^6$ radicals are each a monovalent hydrocarbon radical and the hydrocarbon radical may be bridged cycloaliphatically via the fragment Y; where Y may be a methylene bridge having 0, 1 or 2 methylene units or glycidyl compounds such as glycidyl ethers and/or glycidyl esters of the general formula (IIIb)

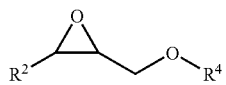
(IIIb)

whose at least one glycidyloxypropyl group is bonded via an ether or ester function $R^4$ to a linear or branched alkyl radical having 1 to 24 carbon atoms, an aromatic or cycloaliphatic radical, onto starter compounds $R^1$—H (IV) where $R^1$ is either a hydroxyl radical or a radical having at least one carbon atom.

10. Process for preparing polyetherols of the formulae (Va) or (Vb) according to claim 1, characterized in that at least one of the two $R^2$ and $R^3$ radicals in formula (IIIa) is hydrogen.

11. Process for preparing polyether alcohols according to claim 1, characterized in that alkylene oxides of the formula (IIa) or (IIb) used are ethylene oxide, propylene oxide, 1,2- or 2,3-butylene oxide, isobutylene oxide, 1,2-dodecene oxide, styrene oxide, cyclohexene oxide, epichlorohydrin, 2,3-epoxy-1-propanol or vinylcyclohexene oxide, or mixtures thereof.

12. Process according to claim 1, characterized in that, the polyetheralcohols having an average molecular masses of below 8.000 g/mol and based on starting alcohols like allyl alcohol, hexenole, butanol, octanol, decanol, dodecanol, stearyl alcohol, 2-ethylhexanol, isononanol, ethylene glycol, propylene glycol, di-, tri- and polyethylene glycol, 1,2-propylen glycol, di- and polypropylene glycol, 1,4-butandiol, 1,6-hexandiol, trimethylol propan and/or glycerol, have polydispersities of higher than or equal to 1.2.

13. Process according to claim 1, characterized in that, the polyetheralcohols having an average molecular masses of higher than 8.000 g/mol have polydispersities of higher than or equal to 1.4.

14. Preparation of polyurethanes using polyether alcohols of the formulae (Va) and (Vb), obtained by a process according to claim 1.

15. Preparation of polyether siloxanes using polyether alcohols of the formulae (Va) and (Vb), obtained by a process according to claim 1.

16. Preparation of surface-active substances or surfactants using polyether alcohols of the formulae (Va) and (Vb), obtained by a process according to claim 1.

* * * * *